United States Patent [19]
Dewaele

[11] Patent Number: 5,986,279
[45] Date of Patent: Nov. 16, 1999

[54] METHOD OF RECORDING AND READING A RADIATION IMAGE OF AN ELONGATE BODY

[75] Inventor: Piet Dewaele, Berchem, Belgium

[73] Assignee: Agfa-Gevaert, Mortsel, Belgium

[21] Appl. No.: 09/035,528

[22] Filed: Mar. 5, 1998

Related U.S. Application Data

[60] Provisional application No. 60/045,868, May 7, 1997.

[30] Foreign Application Priority Data

Mar. 21, 1997 [EP] European Pat. Off. ............ 97200857

[51] Int. Cl.[6] .................................................. H05B 33/12
[52] U.S. Cl. ............. 250/582; 250/363.01; 250/363.02; 250/363.07; 250/363.08; 378/98.12
[58] Field of Search ......................... 250/363.01, 363.02, 250/363.07, 363.08, 582; 378/98.12

[56] References Cited

U.S. PATENT DOCUMENTS

| | | |
|---|---|---|
| 4,590,517 | 5/1986 | Kato et al. ......................... 250/363.01 |
| 4,613,983 | 9/1986 | Yedid et al. .......................... 378/98.12 |
| 4,683,377 | 7/1987 | Hishinuma et al. . |
| 4,710,875 | 12/1987 | Nakajima et al. . |
| 5,111,045 | 5/1992 | Konno et al. . |
| 5,130,541 | 7/1992 | Kawai . |

*Primary Examiner*—Constantine Hannaher
*Assistant Examiner*—Andrew Israel
*Attorney, Agent, or Firm*—Baker & Botts, L.L.P.

[57] ABSTRACT

A radiation image is recorded on a plurality of photostimulable phosphor screens of a size that is smaller than the size of the elongate body. The screens are exposed to a radiation image of a grid of threads of attenuating material and a radiation image of the elongate body so that each of the screens stores part of the image of the body and superimposed thereon, part of the image of the grid. The screens are read out individually. Reconstruction of the image of the elongate body is performed on the basis of the reconstructed image of the grid.

5 Claims, 11 Drawing Sheets

METHOD OF RECORDING AND READING A RADIATION IMAGE OF AN ELONGATE BODY

This application claims benefit of provisional application 60/045,868, filed May 7, 1997.

FIELD OF THE INVENTION

The present invention relates to the recording and reading of a radiation image of an elongate body.

BACKGROUND OF THE INVENTION

In the field of digital radiography a technique has been developed wherein a radiation image, for example an image of X-rays transmitted by an object, is stored in a screen comprising a photostimulable phosphor such as one of the phosphors described in European patent publication 503 702 published on Sep. 16, 1992 and U.S. Pat. No. 5,340,661.

The technique for reading out the stored radiation image consists of scanning the screen with stimulating radiation, such as laser light of the appropriate wavelength, detecting the light emitted upon stimulation and converting the emitted light into an electric representation for example by means of a photomultiplier.

The signal is then digitized, processed and subsequently used to control the hard copy recording in image reproducing system such as a laser recorder. For diagnostic purposes the reproduction is viewed and analyzed on a lightbox.

Stimulable phosphor screens used in this technique are selected from a variety of sizes which are adapted to the body part that is examined.

The read out apparatus is designed so that it is able to accommodate and read all these sizes of screens.

However, examination types exist in which a larger part of the body is examined than can be recorded on a single, even the largest sized cassette (among commonly used cassette types).

Examples of such examination types are the diagnosis of the entire vertebral column or of the leg, so-called full leg-full spine examinations, where clinical indication requires that e.g. the full spine be examined at once to enable diagnosis or to qualify diagnosis.

In U.S. Pat. No. 5,111,045 and in U.S. Pat. No. 5,130,541 such applications have been dealt with.

U.S. Pat. No. 5,111,045 discloses a method wherein a radiation image of a large object such as a vertebral column is recorded on first and second stimulable phosphor screens that are successively positioned in the image recording unit of the apparatus with their confronting ends superimposed on each other in the recording position. The stimulable phosphor sheets are circulated in the apparatus along a circulatory path through a recording unit, a read out unit and an erasure unit. Special features are provided to hold the sheets in position at the recording unit. After having been exposed, the sheets are consecutively fed to a read out unit where a digital signal representation of the image stored in a sheet is obtained. Then, the image signals representing the images read out of the two sheets are processed so as to combine image portions corresponding to the superimposed portions of the two photostimulable phosphor sheets, with the result that a combined image signal is produced. No details are given on the way in which this image processing is performed.

U.S. Pat. No. 5,130,541 discloses another method and apparatus for recording a radiation image of an elongate body. The method is based on the use of a plurality of elongated stimulable phosphor screens that are successively fed along a circulary path in a combined and dedicated exposure and read out device. The disclosure generally relates to the handling of the sheets in such a dedicated combined exposure and read out device.

OBJECT OF THE PRESENT INVENTION

It is an object of this invention to provide a method of recording a radiation image of an elongate body on a photostimulable phosphor screen which does not require the use of a photostimulable phosphor screen of dedicated dimensions adapted to the dimensions of the elongate body and/or which does not require the use of a dedicated read out apparatus adapted to the use of such dedicated screen(s).

It is a further object of the present invention to provide a method by means of which a radiation image of an elongate body is obtained that is geometrically correct.

Further objects will become apparent from the description given below.

STATEMENT OF THE INVENTION

To achieve the above objects the present invention provides a method of recording and reading a radiation image of an elongate body, according to claim 1.

The method of the present invention is advantageous in that it does not require the use of phosphor screens of sizes that are adapted to the size of the elongate body.

The method of the present invention provides that a read out apparatus which is designed to accommodate 'normal size' screens can be used for reading the image of an elongate body.

In a specific embodiment a plurality of photostimulable phosphor screens each having a size which is smaller than the size of the elongate body, are placed in a large size cassette in a partially overlapping or in a touching disposition.

The pattern of reference marks may take different forms. Preferably it is composed of a grid or a raster of parallel horizontal and vertical threads of X-ray attenuating material. This embodiment eases the reconstruction of the complete image of the pattern of reference marks.

The pattern of reference marks may be provided in the cassette wherein the plurality of photostimulable phosphor screens are mounted. The cassette is then to be positioned so that the pattern is situated between a source of radiation (X-ray source) and the screens so that, when being exposed, the radiation image of the pattern is recorded on the plurality of photostimulable phosphor screens.

Alternatively the grid may be mounted in the X-ray table or on an X-ray stand in between the X-ray source and the cassette.

In any way must be provided that an image of the pattern of reference marks will be superimposed on the X-ray image of the elongate object.

Following exposure, the individual partial images stored in the individual photostimulable phosphor screens are read out. These partial images consist of a partial image of the pattern of reference marks superimposed on a partial image of the elongate body.

Then, a complete image of the elongate body is constructed by means of the partial images. The reconstruction of the image of the elongate body from the constituent partial images is in the following referred to as 'stitching'.

The way in which the partial images are assembled to form a complete image of the elongate body is guided by the way in which partial images of the pattern of reference marks are to be assembled to form the complete image of the pattern of reference marks. Further details on the way in which these images are formed is described extensively hereafter.

Neither the order of input of the screens into the read out apparatus nor the sense in which these screens are scanned is important since the image of the pattern of reference marks can be used to reconstruct the image of the elongate body from the constituent partial images in a seamless, uninterrupted and correct way.

Prior to stitching the partial images read out of the screens may be viewed on a workstation to enable the operator to select the order and sense of re-assembling the images read out of the different screens. A front-end Graphical User Interface may be used. The following functionality may be supported on the workstation: (1) rotate (90, 180, 270 degrees) functionality; (2) flip horizontal/vertical functionality; (3) anatomical order indication; (4) left-right or top-down composition. These functions may correct for incorrect sense of one or more of the images due to incorrect handling for the individual image screens by the radiology operator etc.

BRIEF DESCRIPTION OF THE DRAWINGS

Particular embodiments of the present invention will be explained with reference to the accompanying drawings wherein FIG. 1 schematically illustrates the positioning of a X-ray attenuating grid and a plurality of phosphor screens in a cassette which is adapted to the dimensions of an elongate body to be irradiated.

FIG. 5 depicts the different dispositions of successive image screens, thereby resulting in the following cases: (a) overlap zone contains one grid line; (b) overlap zone contains two or more grid lines; (c) overlap with no common grid line; (d) touching configuration with no grid line involved; (e) touching configuration with image borders coinciding with grid line; (f) non-overlapping case with no grid line in the non-imaged portion; (g) non-overlapping case with one or more grid lines in the non-imaged portion.

DETAILED DESCRIPTION

Figure 1:
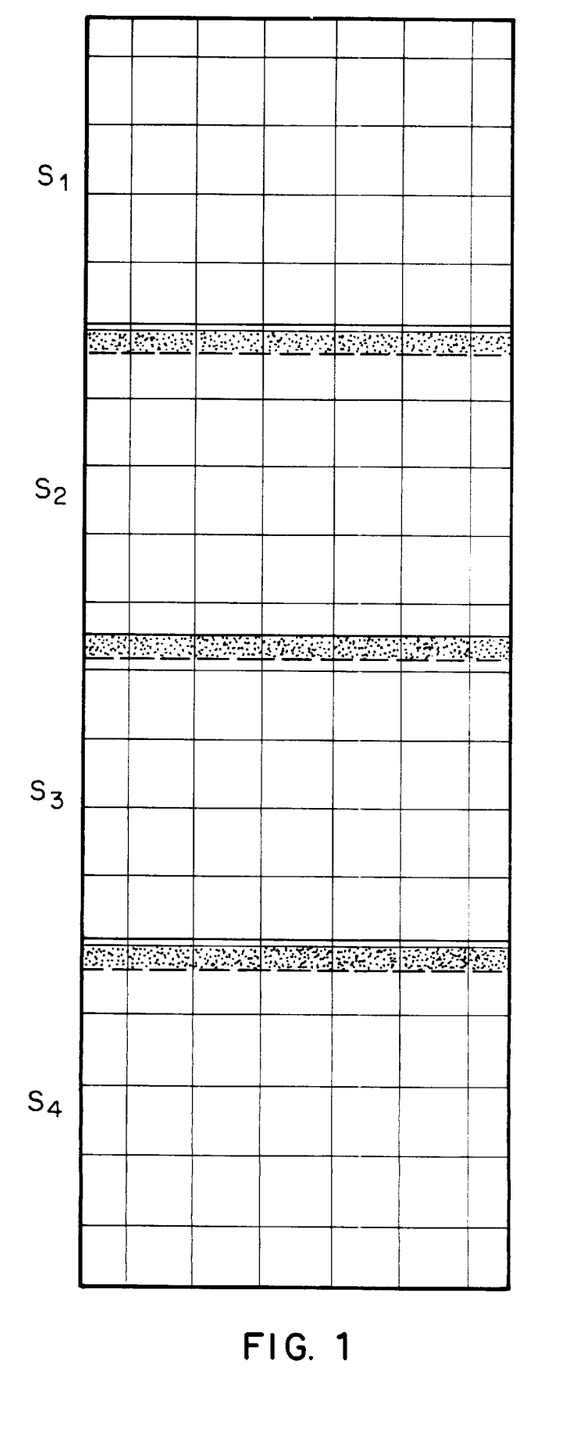

FIG. 1 shows a schematic representation of the contents of a cassette used in e.g. full leg or full spine examinations. It comprises a grid of strongly X-ray attenuating (e.g. metallic) threads, arranged in a rectangular periodic pattern. The grid is positioned in alignment with the cassette's borders. The grid covers the full surface of the cassette in a continuous way. The cassette holds a plurality of photostimulable phosphor screens. The screens may be positioned in a partially overlapping or non-overlapping arrangement.

FIG. 1 shows an arrangement wherein the screens are provided in a partially overlapping position. In this figure the overlap zone is shown in gray and non-visible image screen borders are drawn in dashed lines.

When an elongate body such as a human spine or a human leg is to be irradiated with penetrating radiation such as X-rays to record an X-ray image on a plurality of photostimulable phosphor screens, the elongate body is placed between an X-ray source and the cassette comprising the phosphor screens and the grid of attenuating material so that a partial image of the elongate body and a partial image of the grid is recorded on each of the screens in the cassette.

After exposure, the photostimulable phosphor screens are taken out of the large-size cassette. Each of the screens is then put into a 'normal-sized' cassette (i.e. a cassette the dimensions of which correspond to the size of the individual phosphor screens) and applied to a read out apparatus that is able to accommodate and scan the normal size cassettes.

Figure 2:
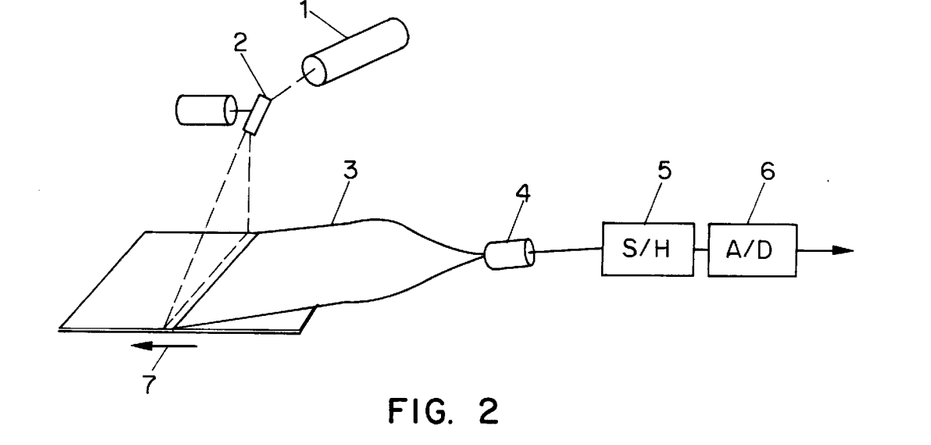
FIG. 2 is a read out apparatus.

The read out station is illustrated in FIG. 2 and comprises a laser 1 emitting light of a wavelength adapted to the stimulation spectrum of the phosphor used, galvanometric light deflection means 2 for deflecting light emitted by the laser onto the photostimulable phosphor screen, a light guide 3 directing light emitted by a stimulable phosphor screen into the light input face of a photomultiplier 4, a sample and hold circuit 5, and an analog to digital convertor 6.

The read out device also comprises a processing module (not shown) for performing online processing on the digital signal representation of the radiation image. The read out signal is applied to a workstation (not shown) for off-line image processing.

The operation of the read out station is as follows.

Stimulating rays emitted by laser 1 are directed onto the photostimulable phosphor screen to scan this screen. The stimulating rays are deflected into the main scanning direction by means of galvanometric deflection means 2. Subscanning is performed by transporting the phosphor screen in the subscanning direction indicated by arrow 7. Upon stimulation, the photostimulable phosphor emits light within a second wavelength range which is different from the wavelength range of the stimulation light. The emitted light is directed by means of a light collector 3 onto a photomultiplier 4 for conversion into an electrical image representation. Next, the signal is sampled by a sample and hold circuit 5, and converted into a digital raw image signal by means of an analog to digital convertor 6.

The signals read out from the different photostimulable phosphor screens are then applied to a workstation for performing stitching, i.e. for re-assembling the image of the elongate body and the image of the grid from the sub-images read from the plurality of screens.

When the individual screens are taken out of the large size cassette and transferred to the normal size cassettes that are read out, it may happen that (1) the order in which the images were placed in the large size cassette (this order corresponds with the order in which the images are to be re-assembled to form the elongate image) and/or (2) the direction into which individual images are to be positioned, is lost.

This problem could be solved by automatic detection of markers on the screens. Alternatively, the individual images may be displayed on a workstation that is equipped with a suitable user interface and the following functionality:

(1) a function that allows indication of the sequence of images to be re-assembled (e.g. top-down order),
(2) a rotation function that allows images to be rotated by a number of times 90 degrees,
(3) a mirroring function (left-right, top-down position),
(4) flip horizontal/vertical function.

Next, the images read out of each of the individual screens are subjected to the stitching method described hereafter.

The method applied to assemble the sub-images read out of the plurality of phosphor screens is based on: (1) the detection and modelling of the periodic grid and (2) cross-correlation of overlapping image parts.

The periodic grid aids to align and stitch the sub-images with respect to each other. Since the grid covers the cassette's surface in a continuous way, the image of the grid should also be present in the assembled image (assembled from the sub-images read out of the plurality of screens) in a continuous way.

The stitching algorithm is able to cope with the following reconstruction malfunctions:

dislocation of the grid in the transverse direction of one sub-image of the elongate body with regard to the grid of the next sub-image, said dislocation being due to dissimilar feed through of the screens, shortening or lengthening of a period of the grid in the longitudinal direction of the elongate body, said period covering partially one sub-image and partially the other subsequent sub-image, rotation of the grid of one sub-image with respect to the grid of the next sub-image, said rotation being due to minor differences in scanning angle in the longitudinal direction of successive sub-images and non-parallel alignment of individual imaging screens in the elongated cassette during exposure.

Figure 3:
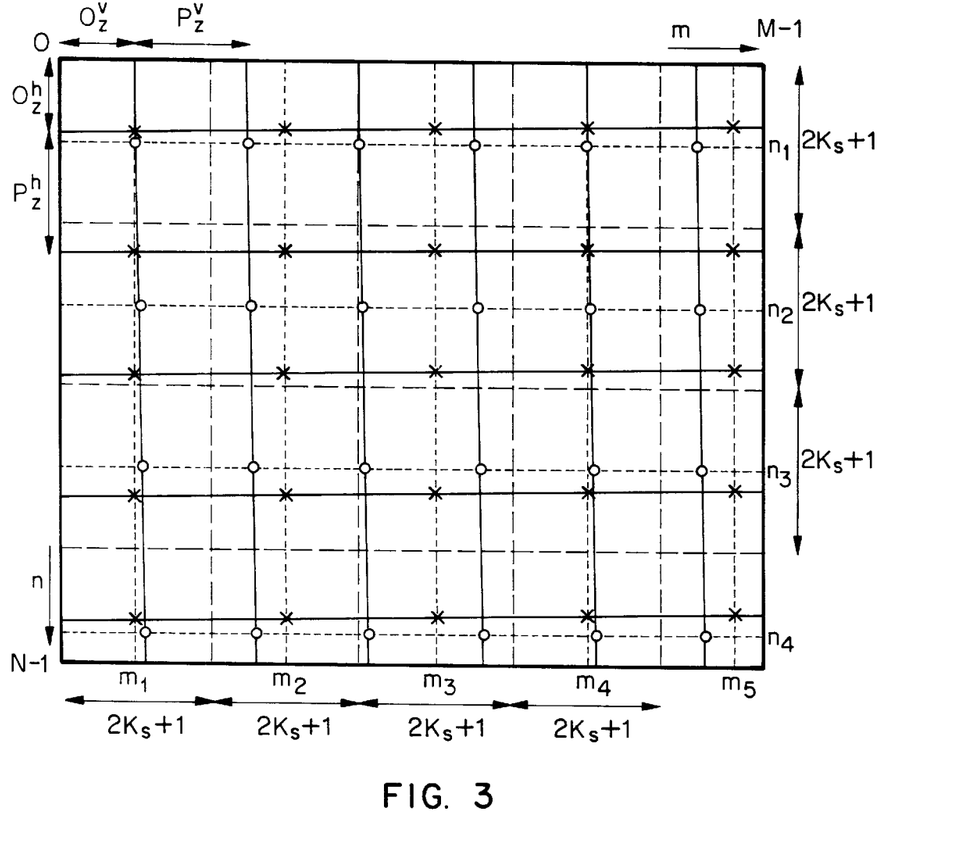
FIG. 3 depicts the image of a grid (solid lines) superimposed on one of the acquired sub-images.

FIG. 3 depicts the image of a grid, represented by solid lines, superimposed on one of the acquired sub-images.

The grid is tilted with respect to the image borders either due to rotation of the screen in the elongated (large size) cassette, or due to rotation of the screen with respect to the scanning axis (due to non-perfect feeding of a screen through the image read out apparatus) or due to a combination of said misalignments. The tilt angle is shown enlarged for clarity.

The figure further depicts grid model parameters: periodicity in horizontal and vertical direction, offset of the first grid line in horizontal and vertical direction, tilt angle. The dashed lines ( - - - ) denote subdivision into rectangular vertical and horizontal blocks for profile calculation, the dotted lines ( . . . ) denote the centre lines of the corresponding blocks.

The hole marks (o) denote the positions of the vertical grid lines in the horizontal profiles, the cross marks (x) denote the positions of the horizontal grid lines in the vertical profiles.

Coordinates used in the process of image re-assembling are defined relative to a coordinate system. The origin of this system is situated in the upper left corner of FIG. 3, with coordinate m running inside a row from left to right along different columns (in the horizontal direction), coordinate n running from top to bottom along different rows (in the vertical direction). The solid lines represent the imprint of the attenuating grid onto the image.

The raster formed by the grid lines may be tilted with an angle $\alpha^h$ with respect to the horizontal axis. Normally, the tilt angle $\alpha^h$ is small and has been drawn in an oversized way for clarity.

Basic to the operations is the detection and characterization of the grid which produces a rectangular pattern of less exposed pixels in each of the sub-images $S_z$, z=1 . . . Z, read from individual screens.

Z is the total number of sub-images to be stitched and is typically 3 or 4. The method however applies to any number of sub-images.

The pattern formed by the grid in sub-image $S_z$ is fully characterized by the knowledge of:

(1) the period $P_z^h$ and $P_z^v$ between the gridlines in horizontal resp. vertical direction,
(2) the angle $\alpha_z^h$ of the horizontal gridlines with respect to the image borders, further assuming that the vertical gridlines are perpendicular to the horizontal ones, and
(3) the offset $O_z^h$ and $O_z^v$ of horizontal and vertical gridlines with respect to the horizontal image border and the vertical image border respectively.

A model of the digital grid for each of the sub-images $S_z$, z=1 . . . Z thus consists of five parameters, ($P_z^h$ and $P_z^v$), ($O_z^h$ and $O_z^v$), $\alpha_z^h$. Knowledge of the sets of these parameters is a necessary and sufficient condition for the reconstruction or prediction of the image of the grid in the sub-images and for forming a re-assembled image of the grid and consequentially also of the elongated body by image stitching.

In the sequel, (i,j) and (m,n) denote image coordinates. (M,N) denote the image dimensions. It is assumed without loss of generality that all sub-images have equal dimensions.

Figure 4:
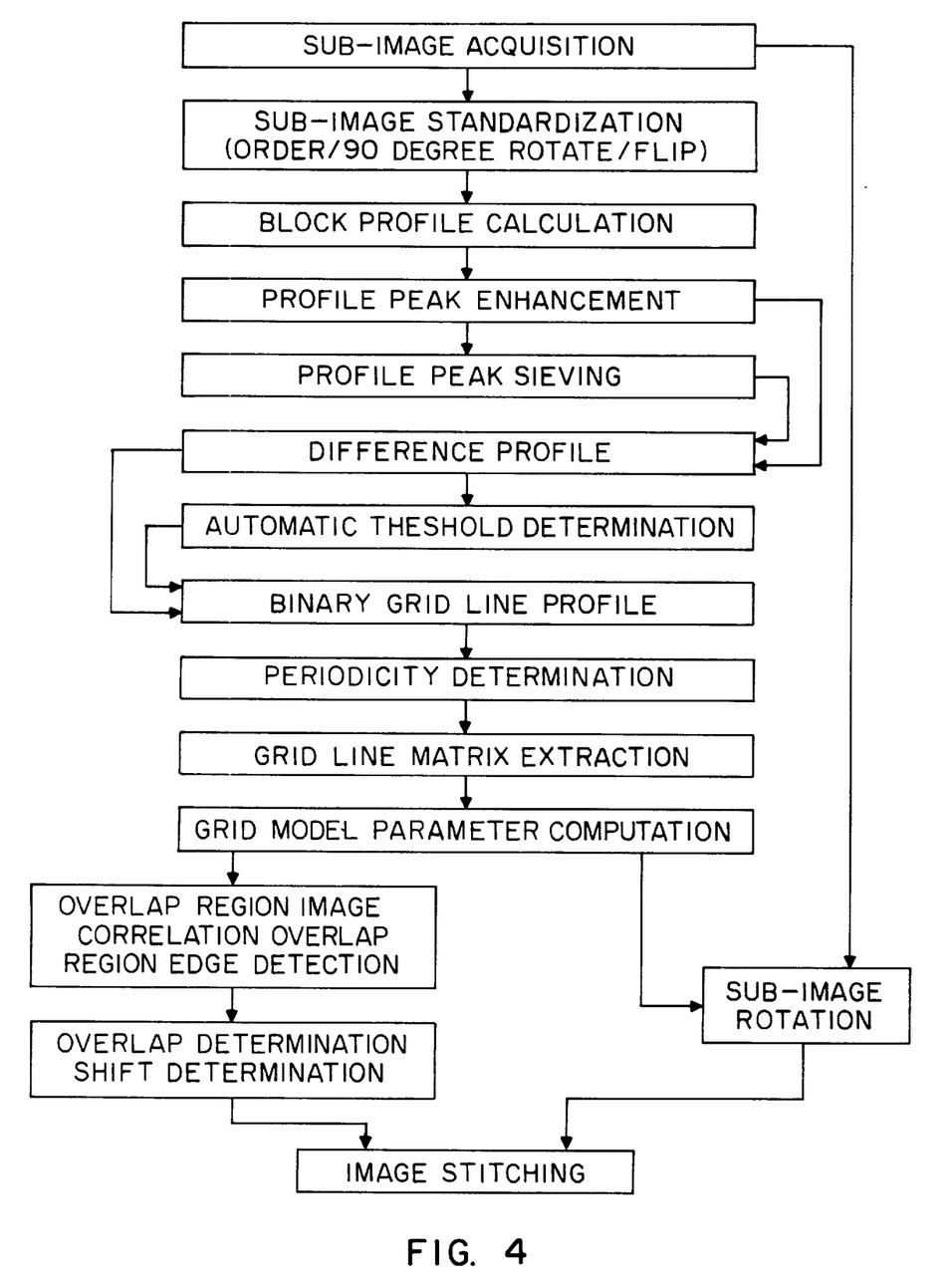
FIG. 4 is a block diagram of the different steps of the algorithm.
Figure 5A:
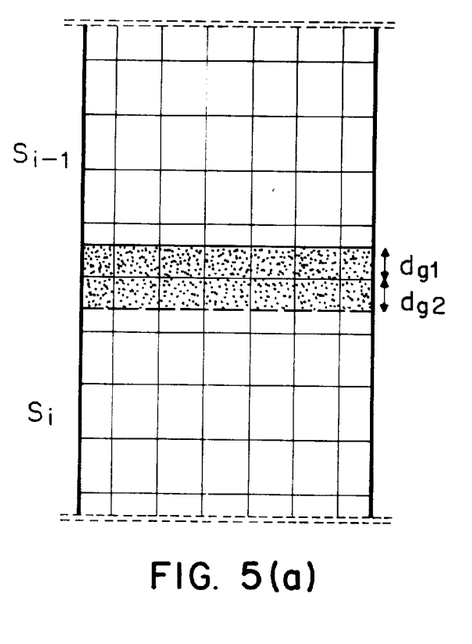
Figure 5B:
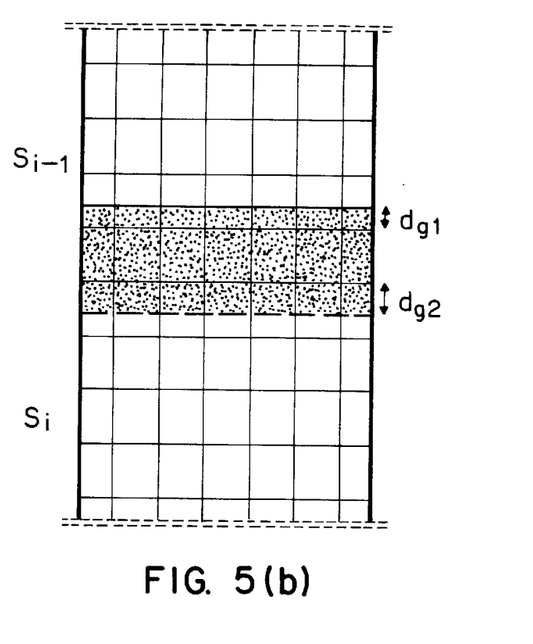
Figure 5C:
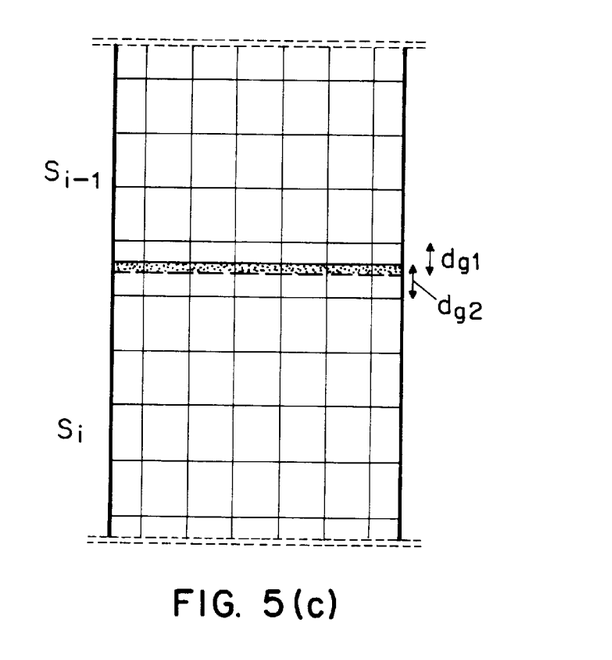
Figure 5D:
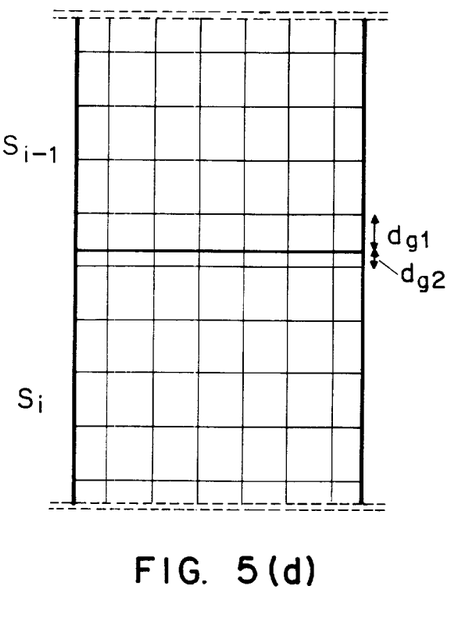
Figure 5E:
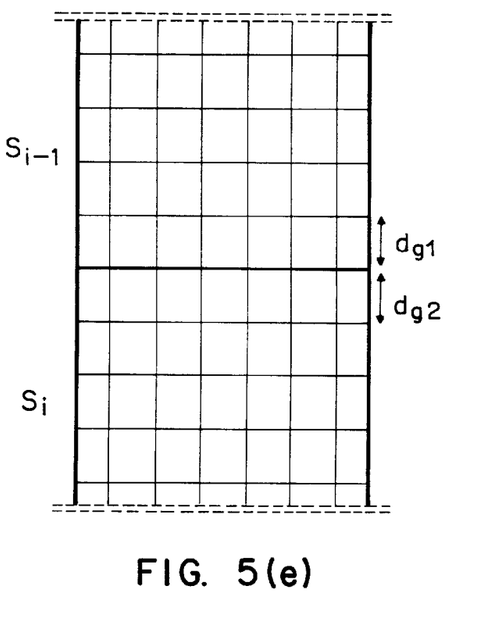
Figure 5F:
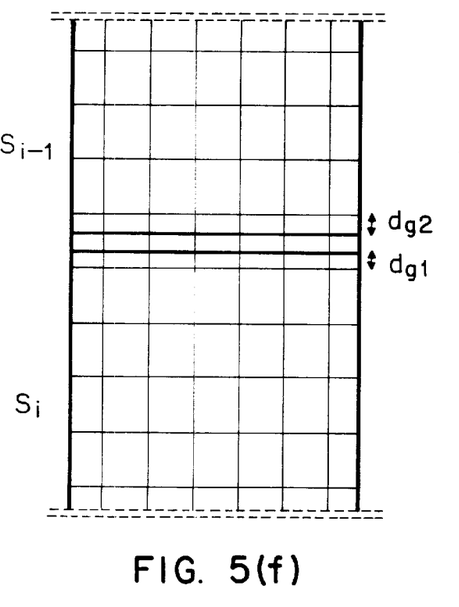
Figure 5G:
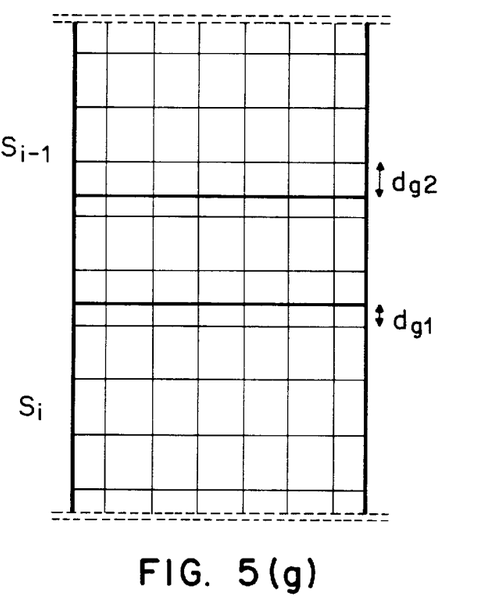

FIG. 4 depicts the general flow of operations, the steps of which are further commented.

Sub-image Acquisition

The first step, namely the acquisition of the sub-images has already been described higher. The sub-images are acquired by reading the individual phosphor screens.

Sub-image Standardisation

This step refers to the functions that are performed on the workstation prior to the stitching in order to provide that the partial images are processed in the right order, the right sense etc. The functions have been described higher, they include rotation, mirroring etc.

Block Profile Calculation

The grid lines appear in the gray value profile of a horizontal or vertical line of pixels through the image, in the form of a signal peak superimposed onto the original diagnostic gray value originating from the elongate body.

Fluctuations in the profile corresponding to original diagnostic gray values may however immerse the peak corresponding to a grid line and may therefore cause poor detectability of the grid lines.

In order to increase the signal to noise ratio (SNR), a block of gray value profiles is integrated. In this context of this paragraph, since it is the object to detect the image of grid lines, the noise is composed of image fluctuations due to diagnostic detail whereas the relevant signals are the signal peaks representative of the grid lines .

For example, to achieve a better signal to noise ratio for signals representing horizontal gridlines, a horizontal box smoothing filter is applied to each sub-image $S_z$ to obtain $\overline{S}_z^h$. In a similar way, by applying a vertical box smoothing filter, the signal to noise ratio for vertical gridlines is enhanced so that an image $\overline{S}_z^v$ is obtained.

Denoting by (2 $K_s$+1) the size of the smoothing kernel that is used, $\overline{S}_z^h$ and $\overline{S}_z^v$ are expressed as $$\overline{S}_z^h(m,n) = \frac{1}{K_s} \sum_{k=-K_s}^{K_s} S_z(m+k,n)$$

$$\overline{S}_z^v(m,n) = \frac{1}{K_s} \sum_{k=-K_s}^{K_s} S_z(m,n+k)$$

In the context of the present invention, $K_s=150$ for sub-images of size typically $M \times N = 2496 \times 2048$.

Preferably the box filter is calculated in a recursive way, needing only one addition and one subtraction per pixel, irrespective of the kernel parameter $K_s$.

FIG. 3 shows an example of horizontal and vertical blocks used for integration, these blocks are represented by horizontal and vertical dashed lines ( - - - ) respectively. The centre line of each of the blocks is indicated with a horizontal resp. vertical dotted line ( . . . ).

From the images $\overline{S}_z^h$ and $\overline{S}_z^v$, the sequences $B_{zq_h}^h$, $q_h=1, \ldots Q_h$ and $B_{zq_v}^v$, $q_v=1, \ldots, Q_v$ of integrated profiles are extracted by sub-sampling $\overline{S}_z^h$ resp. $\overline{S}_z^v$ along rows resp. columns, each profile representing the integration of the original image $S_z$ row-wise in a block of columns, resp. column-wise in a block of rows:

$$B_{zq_h}^h(n) = \overline{S}_z^h(m_{q_h}, n) = \frac{1}{K_s} \sum_{k=-K_s}^{K_s} S_z(m_{q_h}+k, n)$$

$$n = 0, \ldots, N-1; q_h = 1, \ldots Q_h$$

$$B_{zq_v}^v(m) = \overline{S}_z^v(m, n_{q_v}) = \frac{1}{K_s} \sum_{k=-K_s}^{K_s} S_z(m, n_{q_v}+k)$$

$$m = 0, \ldots, M-1; q_v = 1, \ldots Q_v$$

Figure 6:
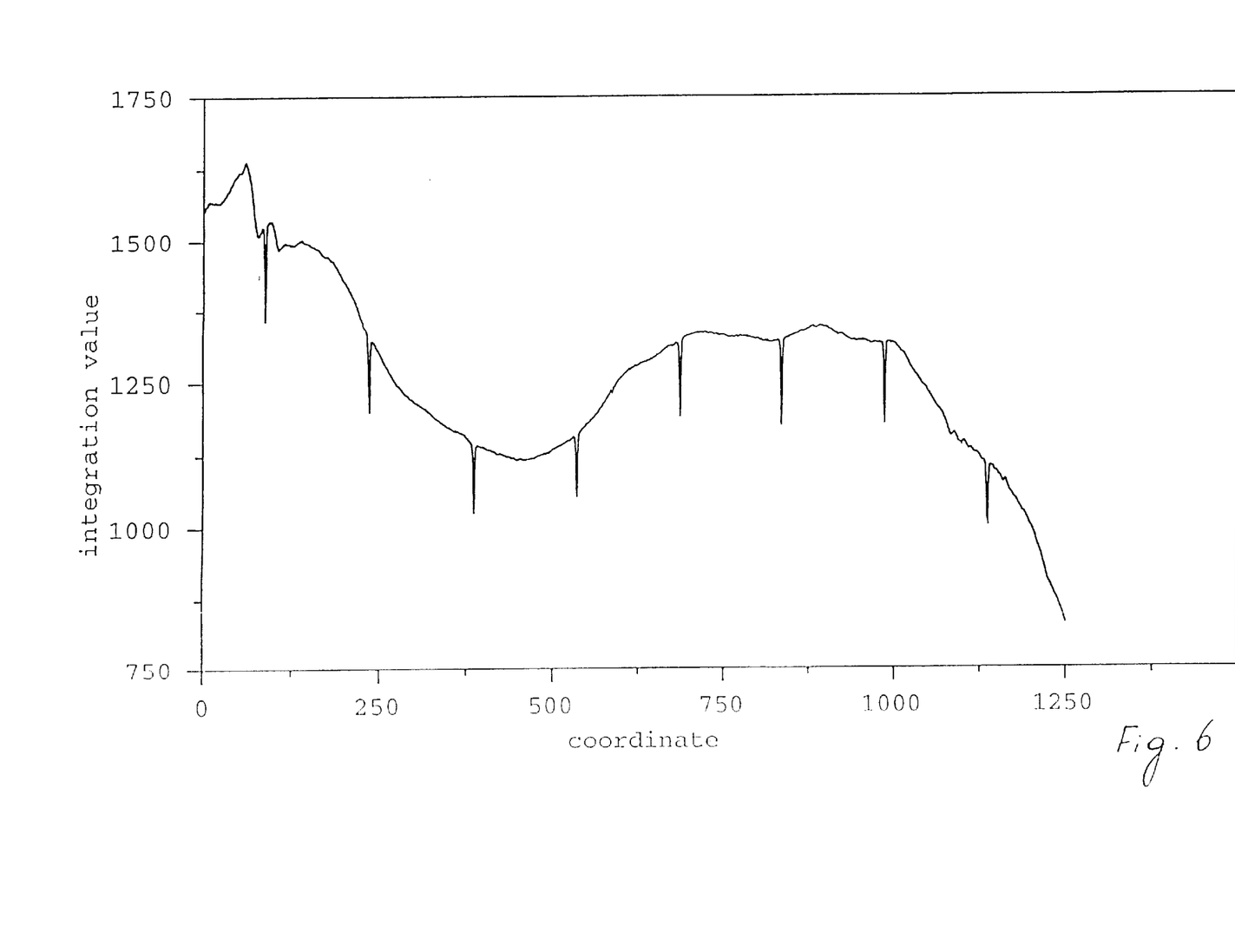
FIG. 6 depicts a typical integration profile in a block of lines.

Typically, the sequences of blocks associated with the central lines with coordinate $m_q$ resp. $n_q$ can be either spaced apart from one another or overlapping. In the context of the present invention, depending on the original image dimensions (M,N), the number of blocks $Q_h$ is in the range 4 . . . M, the number of blocks $Q_v$ is in the range 4 . . . N. The cases $Q_h=M, Q_v=N$ represent the situations in which all computed arrays of subsequent profiles can be viewed as images. FIG. 6 depicts a typical integration profile in a block of lines.

Profile Peak Enhancement

The grid lines appear in the form of peaks in the block profiles. Because the size $K_s$ is much smaller than the image dimension M and N, the grid lines will form peaks even when the raster is tilted with an angle $\alpha$.

The effect of the rotation is a broadening of the peaks resulting in a decreased detectability. In order to cope with poor detectability, the sequence of profiles is next submitted to a peak enhancement step by means of a Laplacian filter. Executed one-dimensionally on the profiles $B_{zq_h}^h$ and $B_{zq_v}^v$, it acts as a peak sharpening filter on the profiles, thereby enhancing the detectability of the peaks associated with the grid lines. $F_{zq_h}^h$ and $F_{zq_v}^v$ denote the peak sharpened profiles and are obtained by $$F_{zq_h}^h(n) = 2B_{zq_h}^h(n) - B_{zq_h}^h(n-K_L) - B_{zq_h}^h(n+K_L) \quad n=0, \ldots, N-1; q_h=1, \ldots, Q_h$$

$$F_{zq_v}^v(m) = 2B_{zq_v}^v(m) - B_{zq_v}^v(m-K_L) - B_{zq_v}^v(m+K_L) \quad m=0, \ldots, M-1; q_v=1, \ldots, Q_v$$

Figure 7:
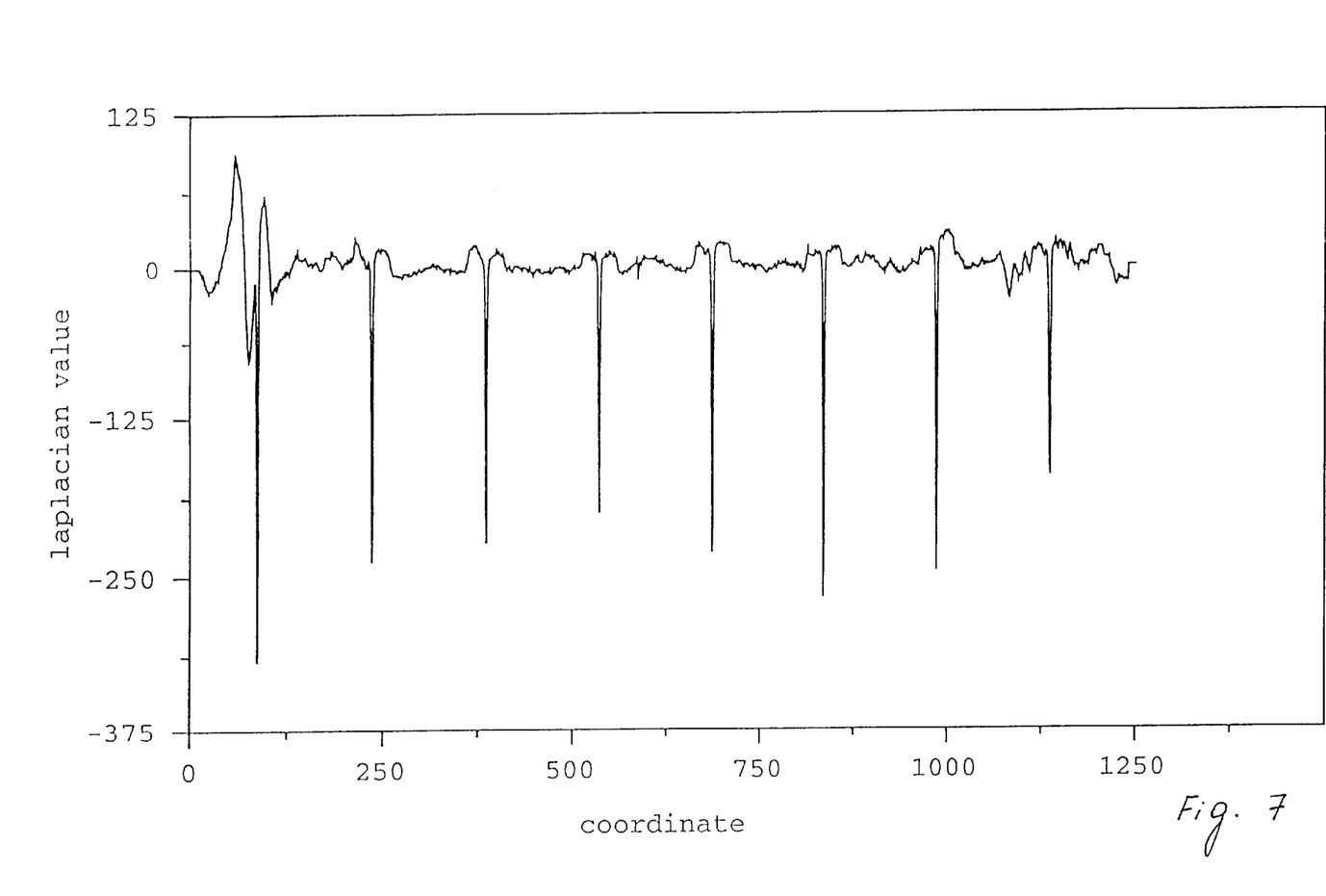
FIG. 7 depicts the Laplacian enhanced profile of FIG. 6.

The optimal Laplacian mask size, expressed in pixel units, depends on the pixel width of the peaks corresponding to grid lines, said size being a function of the thickness of the physical grid threads and the digitization resolution. The thickness of an attenuating grid line typically is in the range of 0.5 to 1 mm. This corresponds with 6 to 12 pixels when an image recorded in a photostimulable phosphor screen of 35×43 cm is digitized at a resolution of 2048×2496 pixels. In the context of the present embodiment, the halfwidth $K_L$ of the Laplacian filter equals 11. FIG. 7 depicts the Laplacian enhanced profile of FIG. 6.

Profile Peak Sieving

The peaks corresponding to grid lines are extracted using a known technique based on the sifting theory. This technique is for example described in "S. Herman, An introduction to sifting theory, SPIE Vol. 767, Medical Imaging (1987), pp. 332–337". Sifting is a nonlinear signal processing method with characteristic operation analogous to the operations in linear filter theory. In one dimension, a sifting filter is able to 'sieve' peaks so as to separate them according to their width. Depending on the hole size of the sieve, peaks with smaller base will fall through, peaks with larger base will be retained. Therefore, the analog of the low-pass linear filter is the long-pass sieve filter. Similarly, a short-pass sieve favours short-duration signal components in analogy to a high pass linear filter and a band-pass sieve serves similar purposes as the band-pass linear filter. The difference however between non-linear sieve filters and linear filters is that, although long-pass sieves will clip signal components smaller than the hole size, they will not alter the shapes of any signal components larger than the hole size, they will not change the edges of such long duration signals. A further important difference is that linear filters operate on both positive and negative going signal features. Their non-linear sieve equivalent is called a bipolar sieve. However, it is also possible to have a monopolar sieve. Such a sieve will clip only the positive or negative going signals, but not both. The grid detection problem presents itself as one of sieving the peaks corresponding to grid lines only. These peaks are by their nature only directed in one sense, hence a monopolar sieve is needed to detect them and leave the peaks of other sense intact. In the context of the present invention, a negative monopolar sieve is built composed of a sequence of a maximum operator followed by a minimum operator to eliminate negative going peaks.

$$H_{zq_h}^h(n) = \min_{k=-K_M}^{K_M} \left( \max_{k=-K_M}^{K_M} \left( F_{zq_h}^h(n+k) \right) \right)$$

$$n = 0, \ldots, N-1; q_h = 1, \ldots, Q_h$$

$$H_{zq_v}^v(n) = \min_{k=-K_M}^{K_M} \left( \max_{k=-K_M}^{K_M} \left( F_{zq_v}^v(m+k) \right) \right)$$

$$m = 0, \ldots, M-1; q_v = 1, \ldots, Q_v$$

The maximum operator performs a dilation of positive going signals and an erosion or shrinking of negative ones. The minimum operator performs an erosion of the positive going signals and a dilation or stretching of negative going signals. Naturally, when the gray-value image is inverted, such that gridlines present themselves as positive going peaks, a positive monopolar sieve (composed of a minimum operator followed by a maximum operator) is needed to eliminate the peaks.

Figure 8:
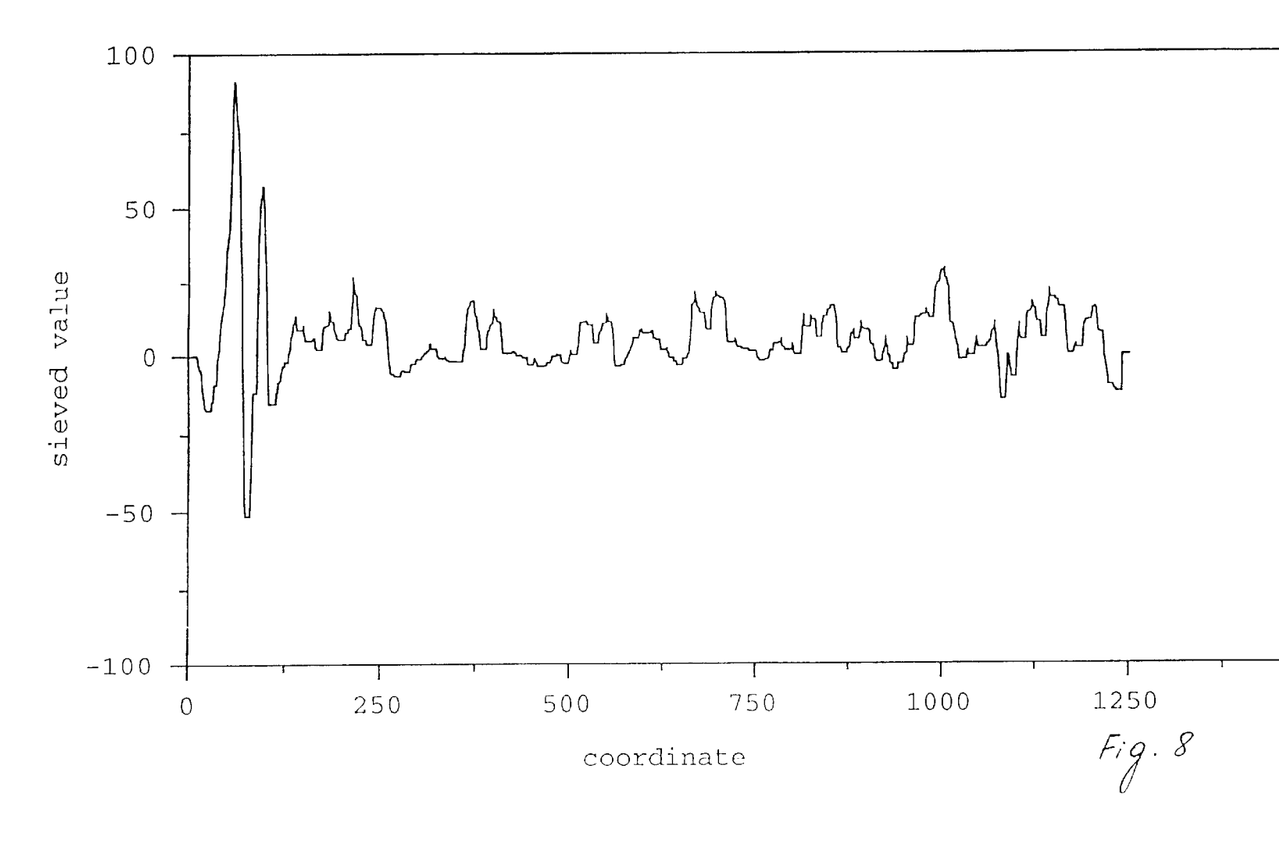
FIG. 8 depicts the result of sieving the profile of FIG. 7.

FIG. 8 depicts the result of sieving the signal represented in FIG. 7. Analogously to the Laplacian halfwidth $K_L$, the sieving halfwidth $K_M$ depends on the pixel width of the grid lines, hence on the physical dimensions of the grid threads, scanning resolution and processing resolution. In the context of the present invention, $K_M$ is in the range 3 . . . 9.

Automatic Difference Profile Thresholding

A signal D containing negative going peaks only is obtained by subtracting the sieved signal H from the Laplacian enhanced signal F $$D_{zq_h}{}^h(n)=F_{zq_h}{}^h(n)-H_{zq_h}{}^h(n) \quad n=0, \ldots, N-1; \ q_h=1, \ldots Q_h$$

$$D_{zq_v}{}^v(m)=F_{zq_v}{}^v(m)-H_{zq_v}{}^v(m) \quad m=0, \ldots, M-1; \ q_v=1, \ldots, Q_v$$

It can be noted that, due to the elimination of negative going peaks only in the sieved signal H and the preservation of positive going signals, the difference D contains zero or negative values only.

Figure 9:
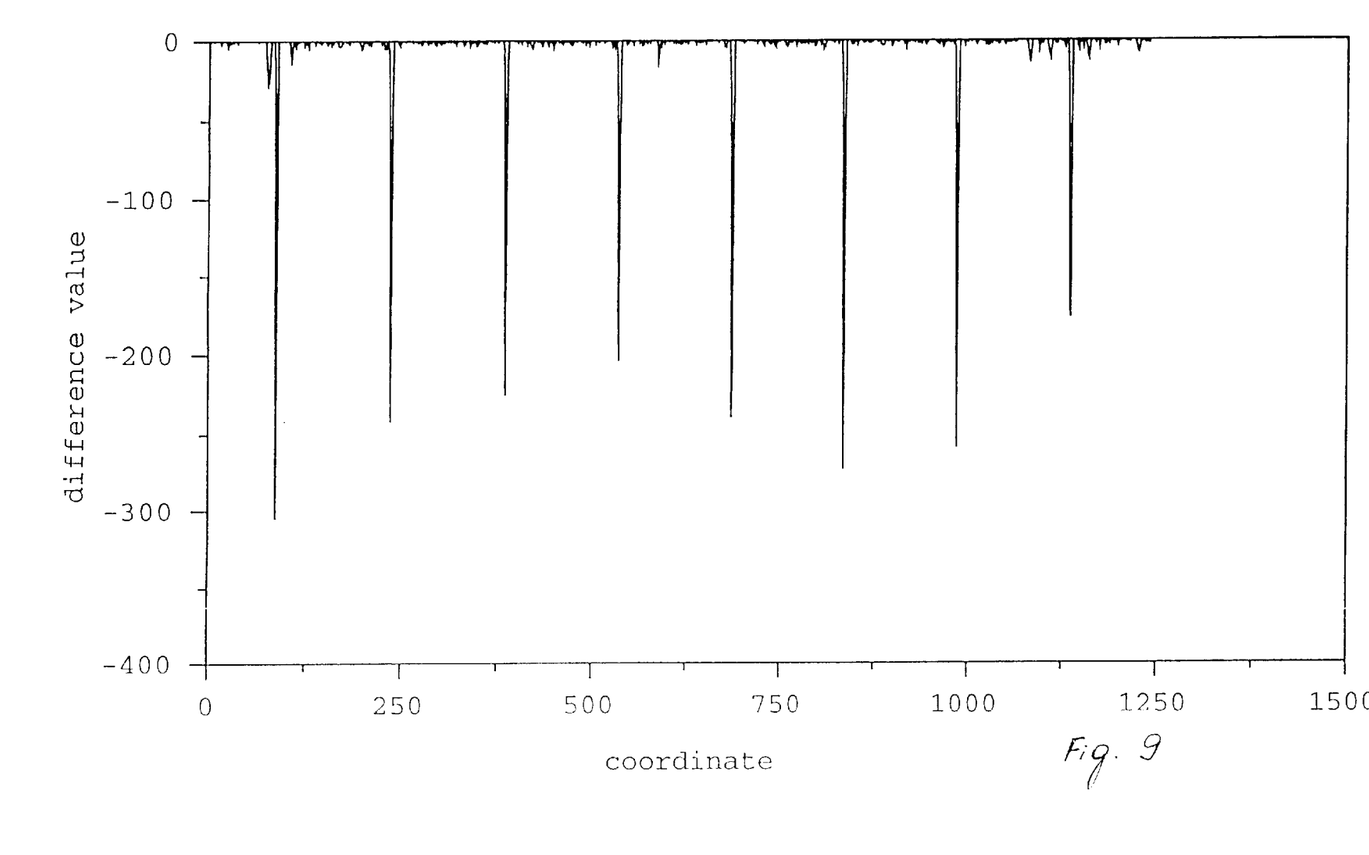
FIG. 9 depicts the difference profile resulting from subtracting the profile of FIG. 8 from the profile of FIG. 7.

FIG. 9 shows the difference profile as a result of subtracting the profile of FIG. 8 from the profile of FIG. 7.

To derive a signal with background noise eliminated, the difference signal D is thresholded with an automatic threshold derived from the array of difference values, sorted e.g. in ascending order.

Alternatively, a percentile of the cumulative histogram values can be used.

$$E_{zq_h}{}^h(n)=\text{sort}\{D_{zq_h}{}^h(n)\} \quad n=0, \ldots, N-1; \ q_h=1, \ldots, Q_h$$

$$E_{zq_v}{}^v(m)=\text{sort}\{D_{zq_v}{}^v(m)\} \quad m=0, \ldots, M-1; \ q_v=1, \ldots Q_v$$

The profile dependent automatic threshold T is determined as a fixed fraction entry of the sorted array E of difference values, multiplied by a factor β.

$$T_{zq_h}{}^h = \beta E_{zq_h}{}^h(\alpha N) \quad q_h=1, \ldots, Q_h$$

$$T_{zq_v}{}^v = \beta E_{zq_v}{}^v(\alpha M) \quad q_v=1, \ldots, Q_v$$

in the context of the present invention α=0.05. A binary signal B is obtained by thresholding D $$B^h_{zq_h}(n) = 1 \text{ iff } D^h_{zq_h}(n) < T^h_{zq_h} \quad n = 0, \ldots, N-1; \ q_h = 1, \ldots, Q_h$$
$$= 0 \text{ elsewhere}$$

$$B^v_{zq_v}(m) = 1 \text{ iff } D^v_{zq_v}(m) < T^v_{zq_v} \quad m = 0, \ldots, M-1; \ q_v = 1, \ldots, Q_v$$
$$= 0 \text{ elsewhere}$$

Figure 10:
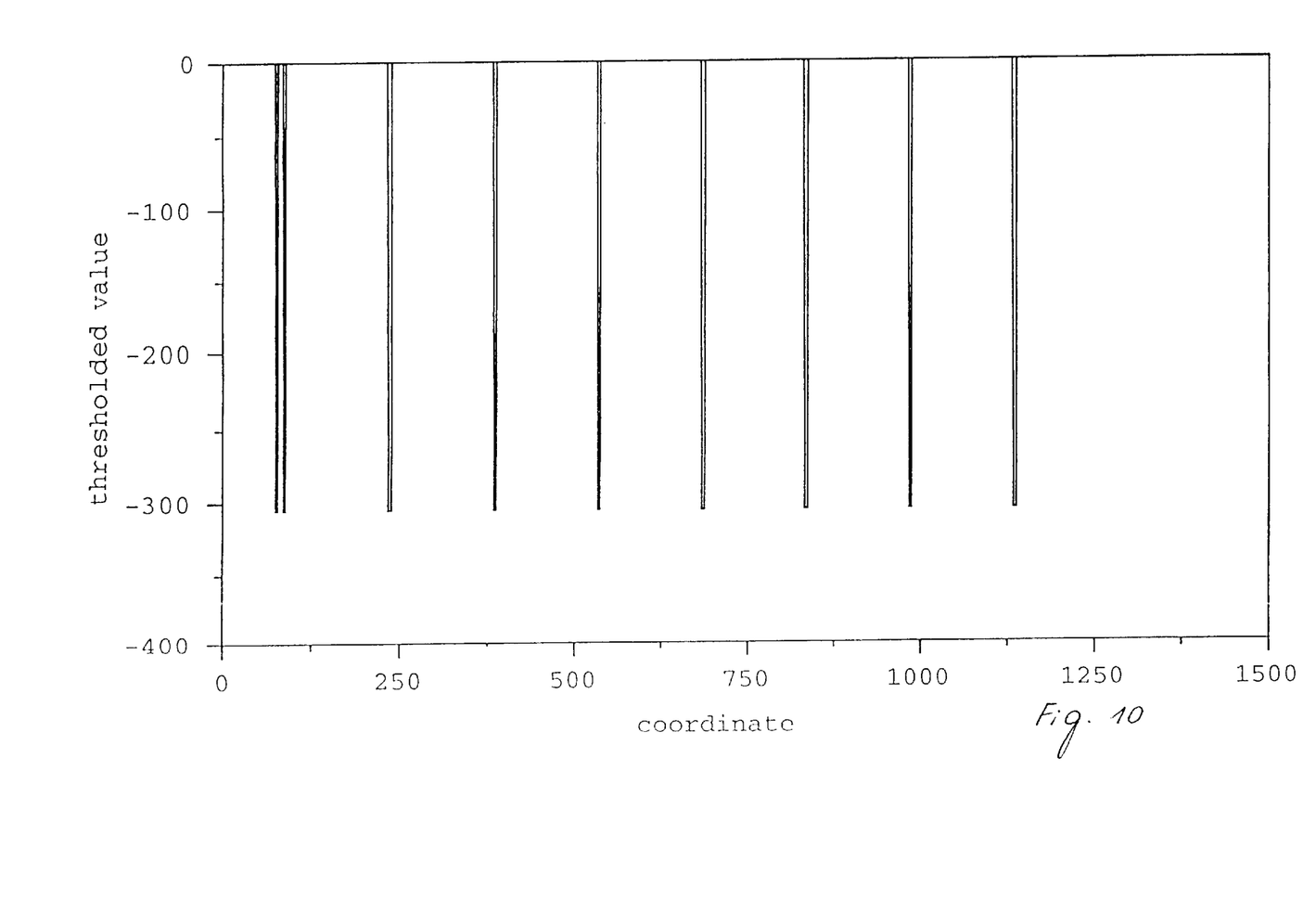
FIG. 10 depicts the thresholded and shrinked profile of FIG. 9.

The binary signal B is further processed to shrink the "1"-intervals to one pixel only to ease subsequent processing. FIG. 10 shows the thresholded and shrinked profile of FIG. 9.

Grid Line Extraction and Periodicity Determination

The thresholded profile shows a marked presence of peaks according to gridlines; however, spurious peaks due to diagnostic detail may still be present. The pattern of peaks corresponding to grid lines has a periodicity. Mutual pixel distances are equal to an integral number of the periodicity numbers $P_z{}^h$ and $P_z{}^v$ searched for. Peaks not corresponding to grid lines will usually have interpixel distances different from an integral number of the periodicity number.

Therefore, a histogram of interpeak distances is built in which the distance between two peaks at coordinates $m_1$ and $m_2$ is divided by the number $I(m_1, m_2)$ of intermediate peaks to yield a normalized distance $d(m_1, m_2)$.

$$h_z^h(d) = h_z^h(d) + 1 \text{ iff } B(n_1) = B(n_2) = 1 \text{ with } d = \frac{(n_2 - n_1)}{I(n_1, n_2)}$$

$$n_1, n_2 = 0, \ldots, N-1, \forall \ q_h$$

$$h_z^v(d) = h_z^v(d) + 1 \text{ iff } B(m_1) = B(m_2) = 1 \text{ with } d = \frac{(m_2 - m_1)}{I(m_1, m_2)}$$

$$m_1, m_2 = 0, \ldots, N-1, \forall \ q_v$$

The index d of the maximum histogram entries $h_z{}^h(d)$ and $h_z{}^v(d)$ will equal the periodicity numbers $P_z{}^h$ resp. $P_z{}^v$ searched for.

The grid is extracted from the series of peaks by an error minimization method. Each peak in the binary profile $B_{zq_h}{}^h(n)$ resp. $B_{zq_v}{}^v(m)$ is subjected to the hypothesis that it corresponds to a physical grid line, and an accumulated error measure of the grid associated with said peak is computed. The peak with the least error attached to it is finally selected as the winner and the associated grid G is extracted by selecting all peaks in the profile $B_{zq_h}(n)$ resp. $B_{zq_v}{}^v(m)$ within an small interval centered around an integral number r of periods from said winner peak.

$$G_{zq_h}{}^h(n) = 1 \forall (n_i, n_j) : |n_i - n_j| = r P_z{}^h \quad q_h = 1, \ldots, Q_h$$

$$G_{zq_v}{}^v(m) = 1 \forall (m_i, m_j) : |m_i - m_j| r P_z{}^v \quad q_v = 1, \ldots, Q_v$$

Figure 11:
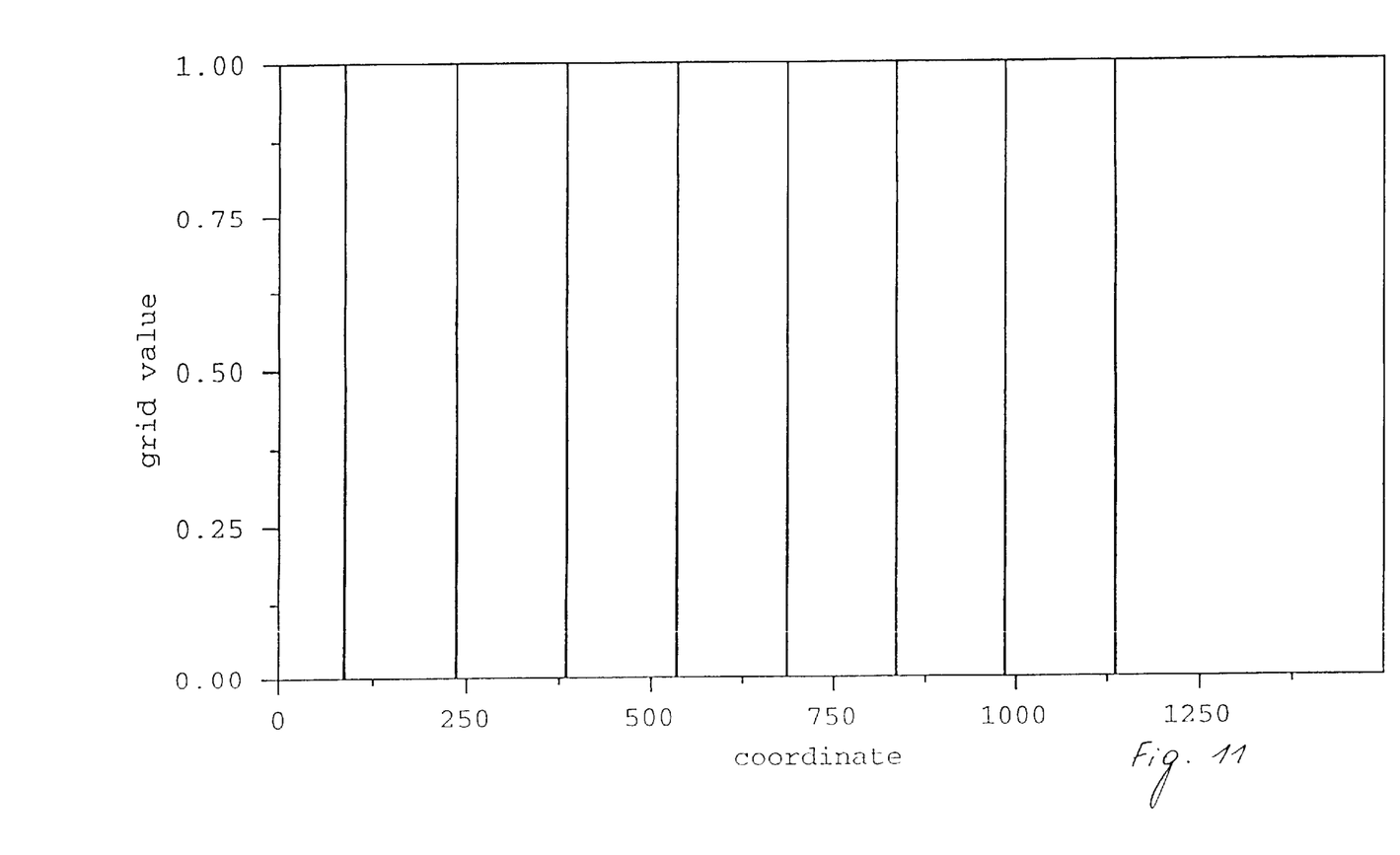
FIG. 11 shows the peaks of FIG. 10 according to grid lines only.

For competing peaks having equal minimum error, the peak with the highest number of associated grid line peaks is selected. The grid sequences G are thus equal to the binary profiles B except for the removed non-grid peaks. FIG. 11 is identical to FIG. 10 except that the non-grid peaks are removed by the disclosed grid detection algorithm.

Grid Model Parameter Computation

The two-dimensional grid of each of the sub-images $S_z$, z=1, . . . ,Z is characterized by the set of 5 parameters $(P_z{}^h, P_z{}^{hu\ v})$, $(O_z{}^h, O_z{}^v)$, $\alpha_z{}^h$. Parameters $(P_z{}^h, P_z{}^v)$ are derived in the periodicity detection and grid lines determination section. The parameters $(O_z{}^h, O_z{}^v)$, $\alpha_z{}^h$ are jointly derived from the sequences G as follows for a sequence of images, presented in top-down order, whereby image $S_z$ is assumed to lay on top of image $S_{z-1}$. Two grid matrices are determined, $g^h$ for the horizontal resp. $g^v$ for the vertical direction, storing the indexes of all grid lines detected from the sequences $G^h$ resp. $G^v$. Obviously, the grid matrices $g^h$ and $g^v$ have substantially smaller size than the sequences $G^h$ and $G^v$. Due to the variability of the diagnostic detail in the image, it may happen that one or more grid lines are not detectable in the derived sequences $G^h$ and $G^v$ respectively. Therefore, whenever a gridline is missing in the sequences $G^h$ resp. $G^v$, a zero is inserted at the corresponding entry in $g^h$ and $g^v$, such that the resulting arrangement of non-zero entries in a column of $g^h$ resp. a row of $g^v$ all correspond to the row resp. column locations of the same grid line passing through successive blocks. By denoting the number of detected grid lines in the sequences $G^h$ and $G^v$ by $N_{g^h}$ resp. $M_{g^v}$, the dimensions of $g^h$ and $g^v$ are $Q^h \text{XN}_{g^h}$ resp. $Q^v \text{XM}_{g^v}$, such that there are $N_{g^h}$ horizontally oriented grid lines detected and $M_{g^v}$ vertically oriented grid lines detected.

Overlap Computation

The overlap between two successive images $S_{z-1}$ and $S_z$ can be partially derived from the matrices $g^h$ from the row position of the lowest horizontal grid line in $S_{z-1}$ and the row position of the highest horizontal grid line in $S_z$. Depending on the physical disposition of the imaging screens (z−1) and z in the elongated cassette at exposure time, different configurations of the screen borders with respect to the grid threads are possible and depicted in FIG. 5.

Denoting by $d_{g1}$ the average distance between the lowest horizontal grid line and the lower border of the image $S_{z-1}$, and by $d_{g2}$ the average distance between the upper border and the highest horizontal grid line of the image $S_z$, the following equations hold, recalling with reference to FIG. 4 that $O_z^h$ signifies the offset of the first horizontal grid line with respect to the horizontal sub-image border $$d_{g1} = \frac{1}{Q^h} \sum_{m=0}^{Q^h-1} g_{z-1}^h(m, N_{g^h} - 1)$$

$$d_{g2} = \frac{1}{Q^h} \sum_{m=0}^{Q^h-1} g_z^h(m, 0)$$

$$O_z^h = d_{g2}$$

Alternative computations of $d_{g1}$ and $d_{g2}$ could be thought of. Since the physical grid is periodic with the same period over all sub-images, it is further assumed that $P_{z_1}^h = P_{z_2}^h = P^h$, $\forall z_1, z_2$, without departing from generality.

It is further assumed that $d_{g1} < P^h$, $d_{g2} < P^h$, the former assumption meaning that all grid lines are visible and detected in the attenuated portion of each sub-image $S_z$, and both assumptions meaning that $d_{g1}$ and $d_{g2}$ represent integer fractions of the period. Should the latter assumption not be met, the integer number of pixels of the incomplete period at either the upper or lower side of the sub-image is easily derived by taking the remainder of the division by $P^h$ ($d_{g1} \leftarrow d_{g1} \% P^h$, $d_{g2} \leftarrow d_{g2} \% P^h$).

Table I summarizes the different cases. When no initial conditions are indicated for the case, $d_{g1}$ and $d_{g2}$ can each vary between O and $P^h$, and no value is imposed as to their sum. Invariably for all cases, a value referred to as the 'first overlap guess' is computed and is equal to $(d_{g1}+d_{g2})\% P^h$. The value of the actual overlap $O_{(z-1,z)}^h$ is computed or verified by means of correlation and edge detection, discussed in the sections 'Overlap region image correlation' and 'Overlap region edge detection'. For the non-overlapping case, no strong correlation value is obtained, and a negative overlap is computed by subtracting an integral number of periods.

The sequences G naturally lend themselves to a Hough transform, commonly known in the prior art such as e.g. W. K. Pratt, Digital Image Processing, Wiley, 1991, p. 613–622, Hough Transform Edge Linking.

It is a basic property of the Hough Transform that each point in the image plane lying on a parameterizable curve, will transform into Hough space such that the Hough array point with coordinates equal to the parameters of the curve searched for will accumulate to a high value. The problem of extracting the grid lines is therefore reduced to a peak or maximum detection problem in Hough space, each peak representing a grid line. The peaks furthermore show the property that they will line up and will be spaced with an integral number of periods from one another, both properties being due to the fact that the corresponding lines are parallel and periodically arranged. The coordinates of each peak correspond to offset and slope (or angle) model parameters of the line.

A second embodiment consists of subjecting each row resp. column of grid coordinates of the grid matrices $g^h$ and $g^v$ to a linear regression, commonly known in the prior art such as T. Pavlidis, Algorithms for Graphics and Image processing, Computer Science Press, 1982, pp. 281–292, Polygonal Approximations. Each linear regression results in the offset and slope of the fit line corresponding to a grid line.

Sub-image Rotation

Each sub-image $S_z$ of which the grid shows an angle $\alpha_z^h$ with the horizontal axis can be brought into alignment with the image borders by rotation over an angel $-\alpha_z^h$. Prior art is used to rotate a digita image artefact-free over a given angle, such as described in "G. Wolberg, Digital Imaging Warpint, IEEE Computer Society Press Monograph, 1990, Chapter 7.3. Rotation" and extended in "M. Unser, P. Thévenaz, L. Yaroslavsky, Convolution-Baser Interpolation for Fast, High-Quality Rotation of Images, IEEE. Trans. on Image Processing, Vol. 4, No. 10, October 1995, pp. 1371–1381". Since the rotation angle is very small (e.g. 4 pixels per 1024, representing an angle of 0.2 degrees), the

TABLE I

| FIG. 5 | configuration | grid line inclusion | initial condition(s) | overlap $0^h_{(z-1,z)}$ |
|---|---|---|---|---|
| a | overlapping | one grid line, same | none | $d_{g1} + d_{g2}$ |
| b | overlapping | more grid lines, same | none | $d_{g1} + d_{g2} + rP^h$, $r > 0$ |
| c | overlapping | no common grid line | $d_{g1} + d_{g2} > P^h$ | $(d_{g1} + d_{g2}) \% P^h$ |
| d | touching | no grid line involved | $d_{g1} + d_{g2} = P^h$ | 0 |
| e | touching | touching with grid line | $d_{g1} = d_{g2} = P^h$ | 0 |
| f | non-overlapping | no grid lines missing | $d_{g1} + d_{g2} < P^h$ | $d_{g1} + d_{g2} - P^h$ |
| g | non-overlapping | one/more grid lines missing | none | $d_{g1} + d_{g2} - rP^h$, $r > 1$ |

Shift Computation

The shift between two successive images $S_{z-1}$ and $S_z$ can be derived from the matrices $g^v$ by computing the average difference in the vertical grid line column coordinates m as follows $$O_{(z-1,z)}^v = \frac{1}{M_{g^v}} \sum_{m=0}^{M_{g^v}-1} (g_{z-1}^v(Q^v - 1, m) - g_z^v(0, m))$$

$$O_z^v = g_z^v(0, 0)$$

Alternative embodiments such as line fitting and Hough transform grid line modelling are possible.

rotation is restricted in an alternative embodiment to a one-dimensional deskew or translation operation only, leading to a time-effective implementation. The offset parameters ($O_z^h$, $O_z^v$) are adjusted accordingly after rotation.

Overlap Region Image Correlation

According to table I, the appropriate overlap formula depends on the overlap configuration and hence cannot be determined unambiguously on the basis of the quantities $d_{g1}$ and $d_{g2}$ alone. The overlap formula in each of the cases enumerated are completed and verified by a correlation computation. Therefore, the algorithm is refined as follows:

compute the quantities $$O_{(z-1,z)0}^h = (d_{g1}+d_{g2})\% P^h$$

associated mean values $\mu_{(z-1)0}{}^h$, $\mu_{(z)0}{}^h$ and correlation value $C_{(z-1,z)0}{}^h$ for the sub-regions of $S_{z-1}$ and $S_z$ defined by the overlap zone. These values are referred to as the intial overlap value, initial mean values and initial correlation value respectively, since they correspond to the minimum possible overlap situation (ignoring the zero overlap situation), smaller than the grid period $P^h$.

augment the value $O_{(z-1,z)0}{}^h$ with an integral number of periods $P^h$ $$O_{(z-1,z)0}{}^h = O_{(z-1,z)0}{}^h + rP^h r=1, \ldots R$$

and compute the sequence of corresponding mean values $\mu_{(z-1)r}{}^h$, $\mu_{(z)r}{}^h$ and correlation values $C_{(z-1,z)r}{}^h$ between the overlapping sub-regions of images $S_{z-1}$ and $S_z$.

the final amount of overlap is determined as the value $O_{(z-1,z)r}{}^h$ for which the corresponding correlation measure $C_{(z-1,z)r}{}^h$ is maximal and above some threshold and for which the mean value $\mu_{(z-1)r}{}^h$ of the overlap sub-region of image $S_{z-1}$ corresponds to the less exposed situation with respect to the mean value $\mu_{(z)r}{}^h$ of the overlap sub-region of image $S_z$, in the assumption that screen z is laid on top of screen (z-1) and hence screen z is attenuating the x-rays impinging on screen (z-1).

when none of the correlation measure $C_{(z-1,z)r}{}^h$, r=0, ... R exceeds the threshold, it is concluded that no overlap is present and the images $S_{z-1}$ and $S_z$ are separated by a negative overlap (a gap) of at least $-(d_{g1}+d_{g2}-P^h)$.

The correlation measure used is based on prior art and is modified as follows to accommodate the situation of attenuation created by overlapping imaging plates $$C_{(z-1,z)r} = |\mu_{(z)r} - \mu_{(z-1)r}| - \frac{1}{A_r(z-1,z)} \left( \sum_i \sum_j |S_z(i,j) - S_{z-1}(i,j)| \right)_r$$

$$R = 0 \ldots, R$$

The second term represents the sub-image correlation in the form of the average sum of absolute differences between $A_r(z-1,z)$ denoting the area of the hypothesized overlap region between sub-images $S_{z-1}$ and $S_z$ at iteration r and with the domain of the indices i, j in the sums confined to said overlap region. Alternatives can be substituted for the correlation term by formulas commonly known in the prior art such as "W. K. Pratt, Digital Imaging Processing, 2nd ed., Wiley Interscience, 1991, pp. 662–671, Image Registration", "L. G. Brown, A Survey of Image Registration Techniques, ACM Computing Surveys, Vol. 24, No. 4, December 1992, pp. 325–376. In an alternative embodiment, a mutual information measure is computed such as disclosed in the prior art in e.g. "P. A. Viola, Alignment by Maximization of Mutual Information, Massachusetts Institute of Technology, A.I. Technical Report No. 1548, June 1995". Obviously, the measure $C_{(z-1,z)r}$ is maximal for overlapping image parts in register with one another.

Overlap Region Edge Detection

The overlap region is further characterized by the property that since the mean value $\mu_{(z-1)r}{}^h$ of the image $S_{z-1}$ is less exposed with respect to the mean value $\mu_{(z)r}{}^h$ of the image $S_z$, the screen corresponding to image $S_z$ will cause a gray value gradient to exist in image $S_{z-1}$. Said gray value gradient will extend over the full image width of image $S_{z-1}$ and is slightly displaced in the upper direction with respect to the overlap value $O_{z-1,z)r}{}^h$ due to a non-scanned portion of the overlaying screen corresponding to image $S_z$. The detection of the presence of the boundary of the overlap zone is therefore used as a verification means of the overlap determination. Prior art is used to calculate the edge gradient and perform the edge thresholding such as "W. K. Pratt, Digital Image Processing, 2nd ed., Wiley Interscience, 1991, Chapter 16, Edge Detection", "A. K. Jain, Fundamentals of Digital Image Processing, Prentice Hall, 1989, Chapter 9.4, Edge Detection", "J. S. Lim, Two-Dimensional Signal and Image Processing, Prentice Hall, 1990, Chapter 8.3, Edge Detection". In the context of the present invention, a threshold of 40 gray value increments on a 12 bit scale is used on the gradient magnitude between gray values of the attenuated overlap sub-region and the unattenuated sub-region of image $S_{z-1}$ respectively, and a persistence of at least 95% of the image width is required in order to attribute the edge to the overlap border.

Image Stitching

Knowledge of the sequences of overlap values $O_{(z-1,z)r}{}^h$ and shift values $O_{(z-1,z)r}{}^v$ between successive sub-images $S_z$, Z=1 ... Z enables to stitch the sequence of images into one composed image.

With reference to FIG. 5:

a positive overlap value $O_{(z-1)r}{}^h$ determines the number of rows to drop from the bottom part of image $S_{z-1}$, a negative overlap value $O_{(z-1,z)r}{}^h$ determines the number of rows to add in at the bottom part of image $S_{z-1}$, a positive shift value $O_{(z-1,z)r}{}^v$ determines the number of columns the image $S_{z-1}$ has to be moved to the left with respect to image $S_z$, a negative shift value $O_{(z-1,z)r}{}^v$ determines the number of columns the image $S_{z-1}$ has to be moved to the right with respect to image $S_z$ in the composed image.

I claim:

1. A method of recording and reading a radiation image of an elongate body, characterised by the steps of
   (a) simultaneously exposing a plurality of photostimulable phosphor screens each having a size which is smaller than the size of the elongate body, to distinct parts of a radiation image of the elongate body and of a pattern of reference marks,
   (b) scanning each of said screens by means of stimulating radiation, detecting light emitted upon stimulation and converting said light into signal representations of images stored in said screens,
   (c) extracting partial signal representations from said digital signal representations, said partial signal representations each representing a part of said pattern of reference marks that was stored in a screen,
   (d) determining from said partial signal representations the position of the image of the part of the pattern of reference marks stored in a screen,
   (e) stitching the signal representations obtained in step (b) in such a way that an image of the total pattern of reference marks is reconstructed making use of the determined positions of the parts of the pattern.

2. A method according to claim 1 wherein said pattern of reference marks consists of a grid of threads of radiation attenuating material.

3. A method according to claim 1 wherein said plurality of screens are conveyed in a cassette in a juxtaposed relationship.

4. A method according to claims 2 wherein said grid is provided in said cassette.

5. A method according to claim 2 wherein said grid is formed by mutually orthogonal horizontal and vertical threads and wherein said position is determined by determining offset of horizontal and vertical lines of the grid with respect to horizontal and vertical image borders, periodicity of said pattern in horizontal and vertical direction, inclination of grid lines relative to horizontal or vertical direction.

* * * * *